(12) United States Patent
Kimura

(10) Patent No.: US 9,937,654 B2
(45) Date of Patent: Apr. 10, 2018

(54) MOLDING DEVICE OF INBUILT COMPONENT FIXING SECTION OF FUEL TANK

(71) Applicant: Toyota Jidosha Kabushiki Kaisha, Toyota-shi Aichi-ken (JP)

(72) Inventor: Miki Kimura, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 163 days.

(21) Appl. No.: 15/197,912

(22) Filed: Jun. 30, 2016

(65) Prior Publication Data
US 2017/0008218 A1    Jan. 12, 2017

(30) Foreign Application Priority Data
Jul. 6, 2015 (JP) ................. 2015-135578

(51) Int. Cl.
| | |
|---|---|
| *B29C 51/10* | (2006.01) |
| *B29C 51/18* | (2006.01) |
| *B29C 65/02* | (2006.01) |
| *B29C 51/30* | (2006.01) |
| *B29K 23/00* | (2006.01) |
| *B29L 31/00* | (2006.01) |

(Continued)

(52) U.S. Cl.
CPC .............. *B29C 51/10* (2013.01); *B29C 51/18* (2013.01); *B29C 65/02* (2013.01); *B29C 51/06* (2013.01); *B29C 51/12* (2013.01); *B29C 51/30* (2013.01); *B29K 2023/065* (2013.01); *B29K 2023/086* (2013.01); *B29L 2031/7172* (2013.01); *B29L 2031/7288* (2013.01)

(58) Field of Classification Search
CPC ......... B29C 51/06; B29C 51/10; B29C 51/18; B29C 51/20; B29C 51/26; B29C 51/30
See application file for complete search history.

(56) References Cited

U.S. PATENT DOCUMENTS

| | | | |
|---|---|---|---|
| 4,660,801 A | * | 4/1987 | Schad .................... B29C 33/46 249/122 |
| 5,308,427 A | | 5/1994 | Duhaime et al. |
| 6,679,399 B2 | | 1/2004 | Franjo et al. |

(Continued)

FOREIGN PATENT DOCUMENTS

| | | |
|---|---|---|
| JP | 2008-507651 A | 3/2008 |
| JP | 2016-020077 A | 2/2016 |

*Primary Examiner* — Joseph S Del Sole
*Assistant Examiner* — Thu Khanh T. Nguyen
(74) *Attorney, Agent, or Firm* — Dinsmore & Shohl LLP

(57) ABSTRACT

A molding device of an inbuilt component fixing section of a fuel tank includes: a projection member that projects out at a placement face onto which a resin sheet that will form a tank configuration member is disposed in a molten state, and that molds a hollow bulge section in the resin sheet; an elastic body that covers the projection member, and that expands and applies pressure to the bulge section from the inside due to a non-compressible fluid being supplied into a sealed space formed between the elastic body and the projection member; a fluid supply device that supplies the fluid into the sealed space in a state in which the bulge section has penetrated through a fixing hole provided in an inbuilt component; and a fixing member that fixes a location of the elastic body corresponding to a leading end portion to the leading end portion.

4 Claims, 12 Drawing Sheets

(51) Int. Cl.
*B29C 51/06* (2006.01)
*B29C 51/12* (2006.01)

(56) References Cited

U.S. PATENT DOCUMENTS

| | | |
|---|---|---|
| 2008/0164639 A1 | 7/2008 | Criel et al. |
| 2014/0034649 A1 | 2/2014 | Criel et al. |
| 2014/0131918 A1 | 5/2014 | Criel et al. |
| 2016/0016347 A1 | 1/2016 | Kimura et al. |

* cited by examiner

MOLDING DEVICE OF INBUILT COMPONENT FIXING SECTION OF FUEL TANK

CROSS-REFERENCE TO RELATED APPLICATION

This application is based on and claims priority under 35 USC 119 from Japanese Patent Application No. 2015-135578 filed on Jul. 6, 2015, the disclosure of which is incorporated by reference herein.

BACKGROUND

Technical Field

The present disclosure relates to a molding device for molding a fixing section for fixing an inbuilt component to an inner portion of a fuel tank.

Related Art

As a method of fixing an inbuilt component to an inner portion of a fuel tank formed of resin, there is a method in which a portion of the fuel tank is melted and pressure is applied from the outside to press out the melted portion in a state in which the melted portion has been pressed into a fixing hole of the inbuilt component. The resin is then cooled and solidified in a state in which a peripheral portion of the fixing hole has been sandwiched between the pressed-out portion and another portion of the fuel tank to fix the inbuilt component to the inner portion of the fuel tank (see, for example, Japanese National Phase-Publication 2008-507651).

However, in the technology described in Japanese National-Phase Publication 2008-507651, a fixing section for fixing the inbuilt component to the inner portion of the fuel tank is molded by melting a portion of the fuel tank. Namely, the resin for forming the fixing section needs to be secured from the periphery of the portion forming the fixing section. It is therefore desirable to reduce the amount of resin required to form the fixing section.

SUMMARY

In consideration of the above circumstances, one aspect of the present disclosure is to provide a molding device of an inbuilt component fixing section of a fuel tank capable of reducing the amount of resin required to form an inbuilt component fixing section for fixing an inbuilt component to an inner portion of the fuel tank.

A molding device of an inbuilt component fixing section of a fuel tank of a first aspect of the present disclosure includes: a projection member that projects out at a placement face onto which a resin sheet that will form a tank configuration member of a tank main body is disposed in a molten state, and that molds a hollow bulge section in the resin sheet; an elastic body that covers an outer periphery of the projection member, and that expands and applies pressure to the bulge section from the inside due to a non-compressible fluid being supplied into a sealed space formed between the elastic body and the projection member; a fluid supply device that is configured to supply the fluid into the sealed space and is configured to recover the fluid from the sealed space, and that supplies the fluid into the sealed space in a state in which the bulge section has penetrated through a fixing hole provided in an inbuilt component; and a fixing member that is attached to a leading end portion of the projection member and that fixes a location of the elastic body, corresponding to the leading end portion to the leading end portion.

In the molding device of an inbuilt component fixing section of a fuel tank of the first aspect, when the resin sheet is disposed on the placement face in the molten state, the bulge section is molded in the resin sheet by the projection member that projects out from the placement face. In the state in which the bulge section has penetrated through the fixing hole of the inbuilt component, the elastic body expands and pressure is applied to the bulge section from the inside due to the non-compressible fluid being supplied from the fluid supply device to the sealed space between the projection member and the elastic body. Pressure is applied to the bulge section by the elastic body that expands in this manner, and a portion of the bulge section is made to jut out as far as a peripheral portion of the fixing hole, such that the peripheral portion of the fixing hole is sandwiched between the jutting-out portion and the resin sheet. After the molten resin has cooled and solidified, the peripheral portion of the fixing hole is sandwiched between the jutting-out portion of the bulge section that has formed the inbuilt component fixing section and the resin sheet that has formed the tank configuration member, and the inbuilt component is fixed to the tank configuration member.

Note that, in the above molding device of an inbuilt component fixing section of a fuel tank, pressure is applied to the hollow projection section from the inside and a portion of the projection section is made to jut out as far as the peripheral portion of the fixing hole to mold the inbuilt component fixing section. This enables the amount of resin required to form the inbuilt component fixing section to be reduced compared to a configuration in which, for example, pressure is applied to a non-hollow projection section from the outside and a portion of the projection section is made to jut out as far as the peripheral portion of the fixing hole to mold the inbuilt component fixing section.

In particular, the location of the elastic body corresponding to the leading end portion of the projection member is fixed to the leading end portion of the projection member using the fixing member. This suppresses the elastic body from expanding in the projection direction of the projection member, and instead increases the expansion amount of the elastic body in a direction orthogonal to the projection direction of the projection member, when fluid is being supplied into the sealed space, compared, for example, to a configuration in which the corresponding location of the elastic body is not fixed to the leading end portion of the projection member. The bulge section is shaped by the elastic body that expands in this manner, such that the bulge section is suppressed from expanding in the projection direction of the projection member, while securing an amount of resin for forming the jutting-out portion of the bulge section. This enables the amount of resin required to form the inbuilt component fixing section to be further reduced.

A molding device of an inbuilt component fixing section of a fuel tank of a second aspect of the present disclosure is the molding device of an inbuilt component fixing section of a fuel tank of the first aspect, wherein a screw hole is provided to the leading end portion of the projection member, and the fixing member is configured including a plate member that is disposed on a surface at the corresponding location of the elastic body, and a screw member that penetrates through the plate member and the elastic body and that includes a screw portion screwed into the screw hole and a screw head portion pressing the plate member toward a leading end portion side of the projection member.

In the molding device of an inbuilt component fixing section of a fuel tank of the second aspect, the screw portion of the screw member is made to penetrate through the plate member and the elastic body and is screwed into the screw hole of the projection member. The plate member is thereby pressed toward the leading end portion side of the projection member by the screw head portion, and the location of the elastic body corresponding to the leading end portion of the projection member is sandwiched and fixed between the plate member and the leading end portion of the projection member. Employing the plate member together with the screw member in this manner enables the corresponding location of the elastic body to be pressed over a wider range than, for example, a configuration in which only the screw member is employed. Thus, expansion of the elastic body in the projection direction of the projection member is further suppressed, and the expansion amount of the elastic body in the direction orthogonal to the projection direction of the projection member is further increased.

A molding device of an inbuilt component fixing section of a fuel tank of a third aspect of the present disclosure is the molding device of an inbuilt component fixing section of a fuel tank of the second aspect, wherein a protruding portion that projects out toward the opposite side to a projection direction of the projection member is formed at an outer peripheral edge portion of the plate member, and an indented portion, in which the protruding portion is housed, is formed at an outer peripheral face of the elastic body.

In the molding device of an inbuilt component fixing section of a fuel tank of the third aspect, the protruding portion formed at the outer peripheral edge portion of the plate member is housed in the indented portion formed at the elastic body. This enables expansion in the circumferential direction to be suppressed at the location of the elastic body corresponding to the leading end portion of the projection member.

A molding device of an inbuilt component fixing section of a fuel tank of a fourth aspect of the present disclosure is the molding device of an inbuilt component fixing section of a fuel tank of the second aspect, wherein a reinforcement member that reinforces a peripheral portion of a through-hole, through which the screw portion penetrates, is disposed inside the corresponding location of the elastic body.

In the molding device of an inbuilt component fixing section of a fuel tank of the fourth aspect, the reinforcement member that reinforces the peripheral portion of the through-hole through which the screw portion of the screw member penetrates is disposed inside the location of the elastic body corresponding to the leading end portion of the projection member. The reinforcement member enables stress to be suppressed from concentrating at the peripheral portion of the through-hole of the elastic body while being expanded.

One aspect of the present disclosure is enabling the provision of the molding device of an inbuilt component fixing section of a fuel tank capable of reducing the amount of resin required to form the inbuilt component fixing section for fixing the inbuilt component to the inner portion of the fuel tank.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a molding device of an inbuilt component fixing section of a fuel tank according to a first exemplary embodiment of the present disclosure.

Figure 1:
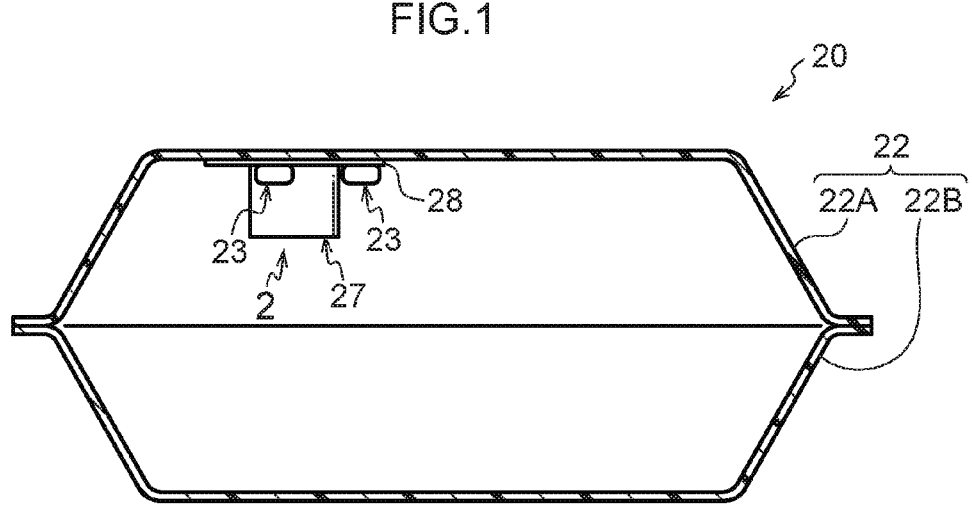
FIG. 1 is a cross-section of a fuel tank molded with an inbuilt component fixing section using a molding device of an inbuilt component fixing section of a fuel tank according to a first exemplary embodiment of the present disclosure.

Explanation first follows regarding a fuel tank 20 molded with inbuilt component fixing sections 23 (hereafter referred to as "fixing sections 23" as appropriate) using a molding device 44 (hereafter referred to as "fixing section molding device 44" as appropriate) of an inbuilt component fixing section of a fuel tank according to the present exemplary embodiment, with reference to FIG. 1.

As illustrated in FIG. 1, the fuel tank 20 is a fuel tank installed in a vehicle, and includes a box shaped tank main body 22 capable of storing fuel in its interior.

The tank main body 22 is formed of resin (thermoplastic resin in the present exemplary embodiment). Specifically, the tank main body 22 is configured including a resin layer, and a barrier layer that has a lower fuel permeability (fuel is not liable to permeate) than the resin layer. High-density polyethylene (HDPE), for example, may be employed as the resin configuring the resin layer. Ethylene vinyl alcohol (EVOH) may be employed as the material forming the barrier layer.

Note that an opening or the like is formed in the tank main body 22 in order to connect piping; however, illustration of the opening or the like is omitted.

The tank main body 22 is formed in a box shape by joining (welding) outer peripheral edge portions of two members divided above and below, these being a tank configuration member 22A and a tank configuration member 22B. The tank configuration member 22A has an overall shape of an upward protrusion (the shape illustrated in FIG. 1). The tank configuration member 22B has an overall shape of a downward protrusion (the shape illustrated in FIG. 1).

Figure 2:
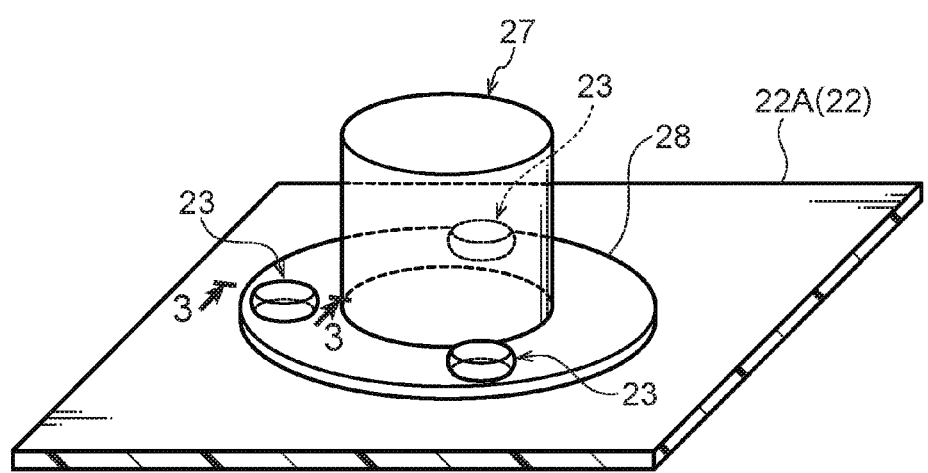
FIG. 2 is an enlarged perspective view of a portion indicated by the arrow 2 in FIG. 1.

As illustrated in FIGS. 1 and 2, an inbuilt component 27 is attached to an inner portion of the tank main body 22. Specifically, a plate shaped fastening seat 28 included in the inbuilt component 27 is fixed to the tank main body 22 by the fixing sections 23 formed to a ceiling portion of the tank main body 22 (a ceiling portion of the tank configuration member 22A).

Examples of the inbuilt component 27 include a small size component such as a breather pipe or a cutoff valve employed in the fuel tank 20. The present disclosure is not limited to this configuration, and the inbuilt component attached inside the fuel tank 20 may be a large component to which a separate inbuilt component is directly attached, or to which a separate inbuilt component is indirectly attached through a bracket. Note that, in cases in which a large component is attached to the tank main body 22, a configuration may be employed in which the fixing section 23 of the present exemplary embodiment, and an inbuilt component fixing section that is a separate structure to the fixing section 23, are employed together.

Figure 3:
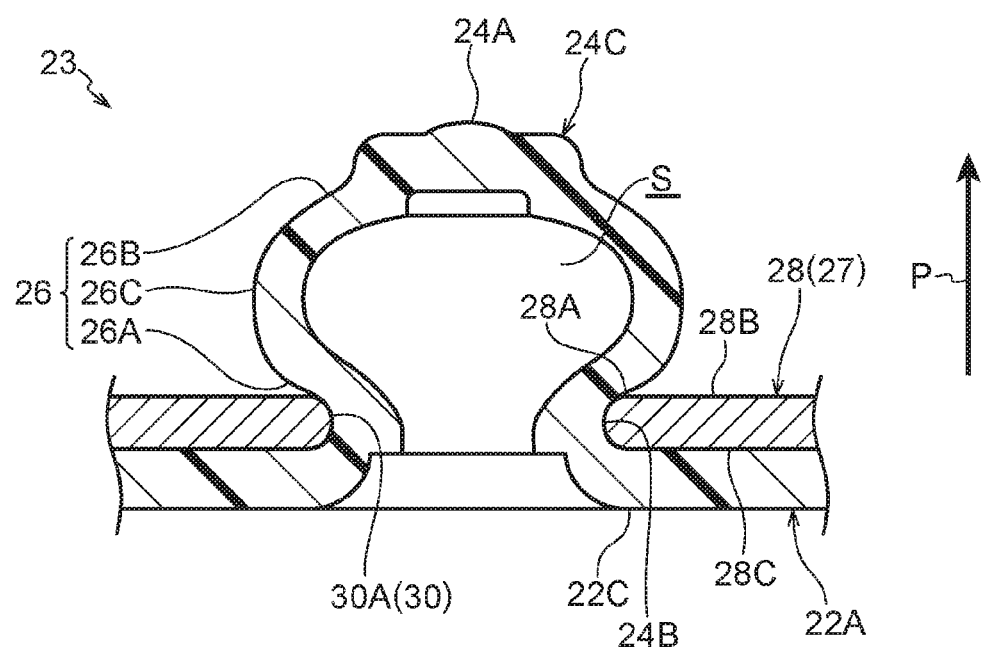
FIG. 3 is a cross-section along line 3-3 in FIG. 2.

As illustrated in FIG. 3, each fixing section 23 is configured including a hollow projection section 24 that is formed to the tank configuration member 22A and projects out inside the tank main body 22, and a jutting-out portion 26 that is formed to the projection section 24. Note that the interior space of the projection section 24 is indicated by the reference numeral S in FIG. 3.

The projection section 24 projects out along the thickness direction (plate thickness direction) of the tank configuration member 22A, and penetrates through a fixing hole 30 formed in the fastening seat 28 of the inbuilt component 27. The projection section 24 has a hollow interior, is formed in a substantially circular tube shape that is closed off at an apex portion 24A, and an outer peripheral face of the portion (hereafter referred to as "inserted portion 24B") that has been inserted into the fixing hole 30 is in close contact with a hole wall face 30A of the fixing hole 30.

The jutting-out portion 26 is formed at a portion (hereafter referred to as "passed-through portion 24C") of the projection section 24 that has passed through the fixing hole 30, and juts out toward an outer peripheral side of the projection section 24 (in other words, the radial direction outside of the projection section 24). Specifically, the jutting-out portion 26 juts out as far as a peripheral portion 28A of the fixing hole 30 of the fastening seat 28. The jutting-out portion 26 is formed about the entire circumference in the circumferential direction of the projection section 24.

Together with a general portion 22C, the jutting-out portion 26 sandwiches the peripheral portion 28A of the fastening seat 28. Specifically, a first jutting-out portion 26A, described later, of the jutting-out portion 26 is in close contact with one face 28B (an upper face in FIG. 3) of the fastening seat 28, and the general portion 22C is in close contact with another face 28C (a lower face in FIG. 3) of the fastening seat 28. The peripheral portion 28A of the fastening seat 28 is thereby sandwiched and fixed (fastened) between the jutting-out portion 26 and the general portion 22C. Note that the general portion 22C referred to herein refers to a portion of the tank configuration member 22A (tank main body 22) where the fixing section 23 is not formed.

The jutting-out portion 26 is configured including the first jutting-out portion 26A that is linked to the inserted portion 24B and juts out toward the radial direction outside of the projection section 24, a second jutting-out portion 26B that is linked to the apex portion 24A and juts out toward the radial direction outside of the projection section 24, and an upright wall portion 26C that links the first jutting-out portion 26A and the second jutting-out portion 26B together and extends along the projection direction of the projection section 24. Thus, when viewed in cross-section (the cross-section illustrated in FIG. 3) along the projection direction of the projection section 24 (the arrow P direction illustrated in FIG. 3), the jutting-out portion 26 has a shape bent into a U-shape, in which the first jutting-out portion 26A and the second jutting-out portion 26B are separated from each other in the projection direction of the projection section 24.

Note that the jutting-out portion 26 of the present exemplary embodiment refers to portion that has a larger diameter than the inserted portion 24B of the projection section 24.

Figure 4:
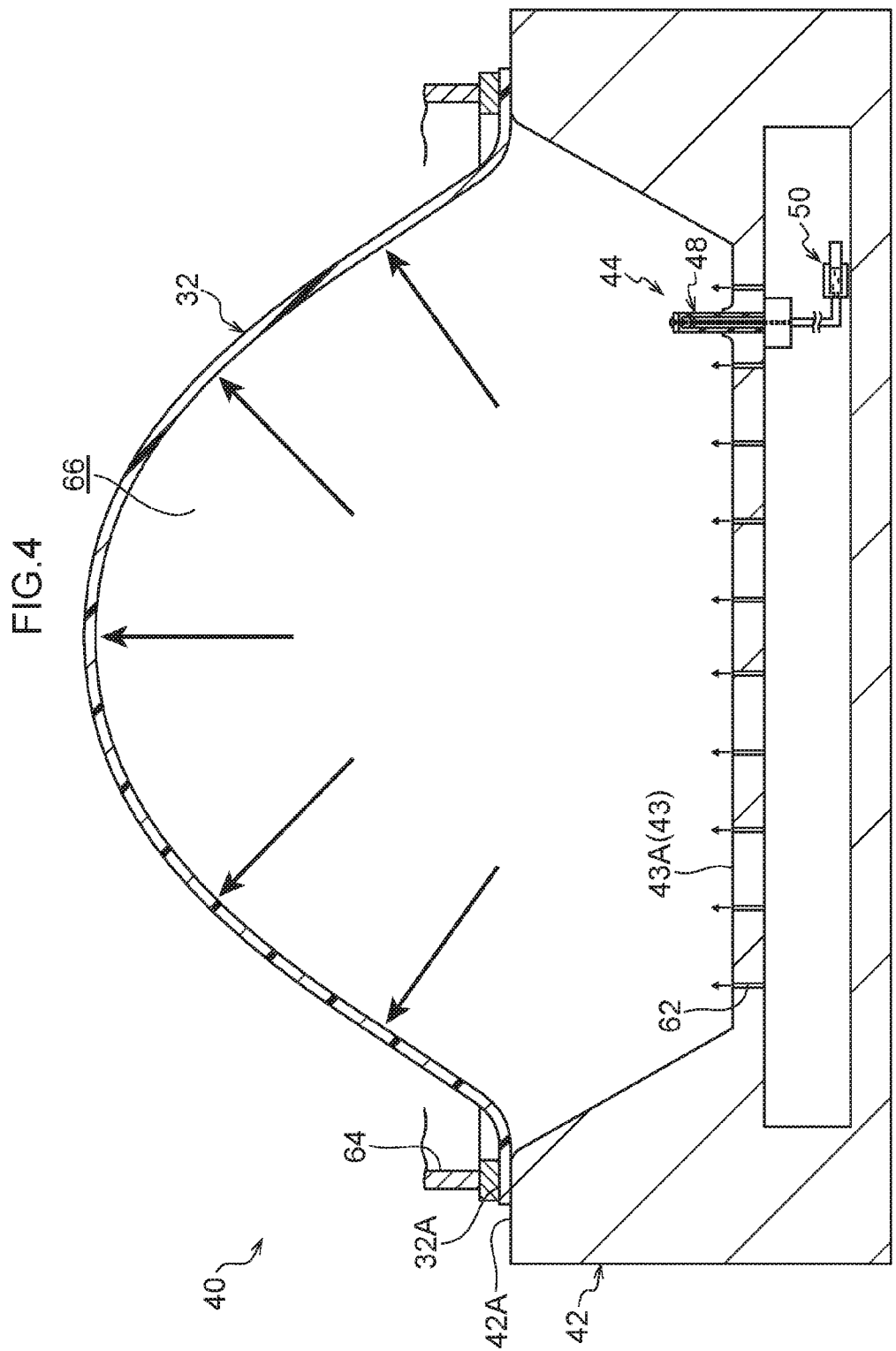
FIG. 4 is a cross-section of a resin sheet, illustrating a state in which the molten state resin sheet that will form a tank configuration member has been set in a mold and expanded.
Figure 6:
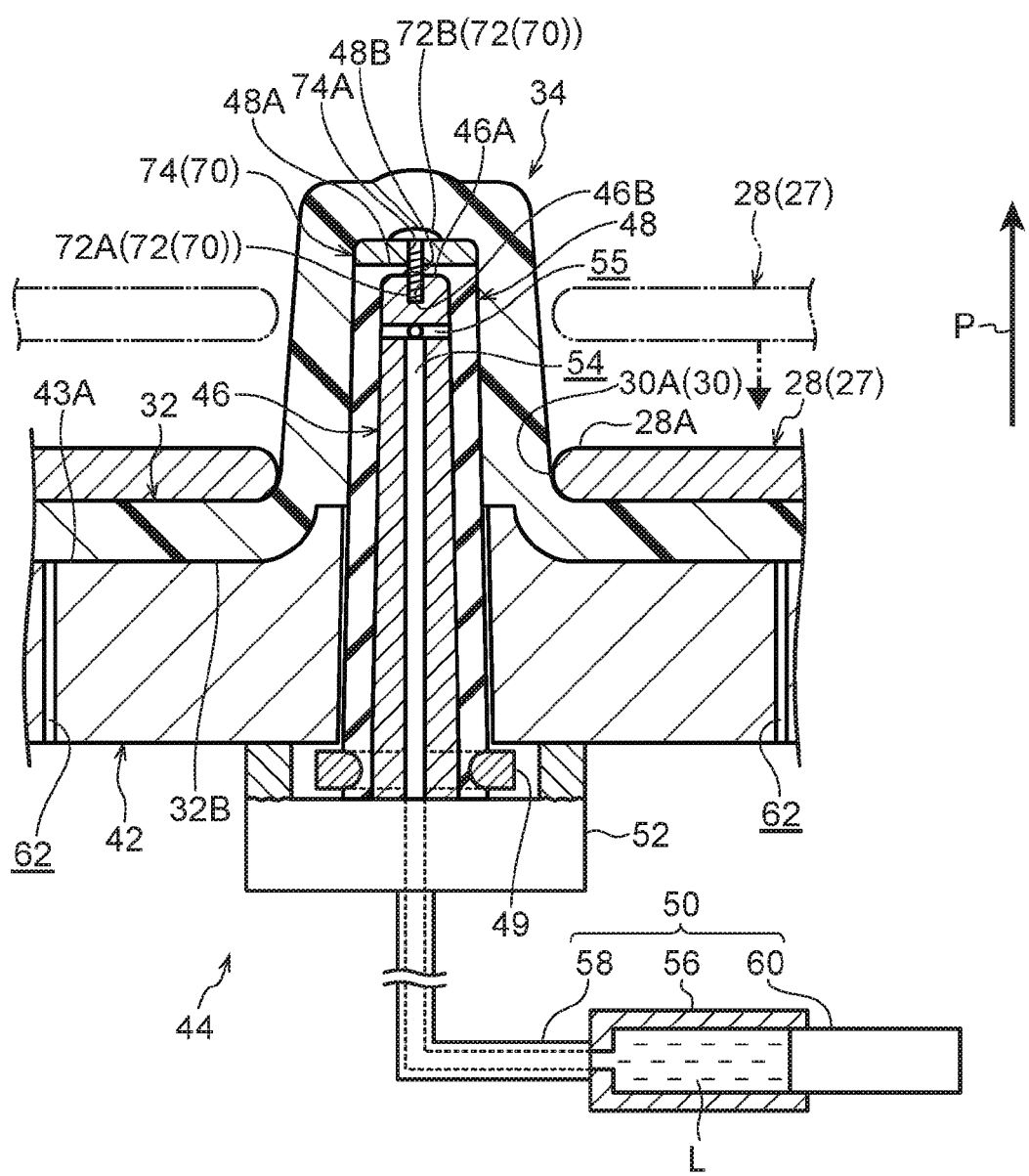
FIG. 6 is an enlarged view of the portion illustrated by the arrow 6 in FIG. 5, illustrating a state in which a bulge section molded in a molten state resin sheet using a projection member has been made to penetrate through a fixing hole of an inbuilt component.

Explanation follows regarding a molding device 40 (hereafter referred to as "tank molding device 40") for molding the tank configuration member 22A of the fuel tank 20 of the present exemplary embodiment. As illustrated in FIGS. 4 and 6, the tank molding device 40 includes a mold 42 and the fixing section molding device 44.

As illustrated in FIG. 4, the mold 42 is a mold for molding a resin sheet 32 in a molten state (hereafter referred to as "molten resin sheet 32") into the tank configuration member 22A, and includes a cavity 43 matching the shape of the tank configuration member 22A.

The fixing section molding device 44 includes a projection pin 46 projecting out at a cavity face 43A (mold face) of the mold 42, an elastic body film 48 that covers the projection pin 46, a fluid supply device 50 that supplies a non-compressible fluid L into a sealed space 66 formed between the projection pin 46 and the elastic body film 48, and a fixing member 70 that fixes a location (an apex portion 48A, described later) of the elastic body film 48 corresponding to a leading end portion 46A of the projection pin 46 to the leading end portion 46A of the projection pin 46.

Note that the projection pin 46 of the present exemplary embodiment is an example of a projection member of the present disclosure, and the elastic body film 48 of the present exemplary embodiment is an example of an elastic body of the present disclosure. The fluid supply device 50 of the present exemplary embodiment is an example of a fluid supply device of the present disclosure, and the fixing member 70 of the present exemplary embodiment is an example of a fixing member of the present disclosure. The cavity face 43A of the present exemplary embodiment is an example of a placement face of the present disclosure.

As illustrated in FIG. 6, the projection pin 46 has a substantially circular column shape, is supported by a bracket 52 attached to an inner portion of the mold 42, penetrates through the mold 42, and projects out from the cavity face 43A in a direction orthogonal to the cavity face 43A. Note that, in the present exemplary embodiment, the outer diameter of the projection pin 46 has a shape (a circular truncated cone shape) in which the outer diameter gradually increases on progression from the leading end portion 46A toward a base portion, not illustrated in the drawings; however, the present disclosure is not limited to this configuration. The projection pin 46 may have a shape (a circular column shape) with a uniform diameter, for example.

As illustrated in FIG. 6, a flow path 54 is formed extending along the axial direction (the projection direction of the projection pin 46) from the base portion of the projection pin 46 toward the leading end portion 46A, and terminating partway through the interior of the projection pin 46. Plural (four in the present exemplary embodiment) branch flow paths 55 that branch off from a terminal portion of the flow path 54 in a direction (the radial direction of the projection pin 46) orthogonal to the axial direction of the projection pin 46 are formed at the leading end portion 46A side of the projection pin 46. The branch flow paths 55 are open at an outer peripheral face of the projection pin 46. In the present exemplary embodiment, the branch flow paths 55 are formed at equal spacings about the circumferential direction of the projection pin 46.

A screw hole 46B is formed to the leading end portion 46A of the projection pin 46. A screw portion 72A of a screw member 72 configuring the fixing member 70 is screwed into the screw hole 46B.

The elastic body film 48 has a shape corresponding to the outer periphery of the projection pin 46, specifically, a substantially circular tube shape (a tube shaped circular truncated cone) that is closed off at the apex portion 48A and in which the outer diameter gradually increases on progression from the apex portion 48A toward a base portion (an open end portion, described later). The projection pin 46 is inserted inside and covered by the elastic film body 48. The open end portion side (a lower end portion side in FIG. 6) of the elastic body film 48 is fastened by a seal ring 49 and fixed to the projection pin 46. The interior of the elastic body film 48 is placed in a sealed state by the seal ring 49. Namely, a sealed space 47 (see FIG. 7) is formed between the elastic body film 48 and the projection pin 46. Thus the elastic body film 48 is expanded by supplying the fluid L into the sealed space 47 through the flow path 54 and the branch flow paths 55, and the elastic body film 48 is contracted by discharging the fluid L from the sealed space 47 through the flow path 54.

A through-hole 48B through which the screw portion 72A of the screw member 72 penetrates is formed to the apex portion 48A of the elastic body film 48.

Note that there is no particular limitation to the material forming the elastic body film 48, as long as the material is capable of withstanding a temperature that can maintain the resin configuring the molten resin sheet 32, described later, in a molten state, expanding due to the fluid L being supplied into the sealed space 47 at this temperature, and contracting due to the fluid L being discharged from the sealed space 47 after the molten resin has cooled and solidified. A silicone-based rubber with a heat resistance temperature of approximately 250° C., for example, may be employed.

The fixing member 70 is configured including a plate member 74 that is disposed on the surface of the apex portion 48A of the elastic body film 48, and the screw member 72 that penetrates through a through-hole 74A provided to the plate member 74 and the through-hole 48B of the elastic body film 48 with the screw portion 72A screwed into the screw hole 46B.

The screw member 72 is configured including the screw portion 72A and a screw head portion 72B. The screw head portion 72B presses the plate member 74 toward the leading end portion 46A side of the projection pin 46 due to the screw portion 72A being screwed into the screw hole 46B. Namely, the screw head portion 72B presses the plate member 74 against the apex portion 48A of the elastic body film 48. The apex portion 48A of the elastic body film 48 is accordingly sandwiched between the plate member 74 and the leading end portion 46A of the projection pin 46, and the apex portion 48A is fixed to the leading end portion 46A.

Figure 9:
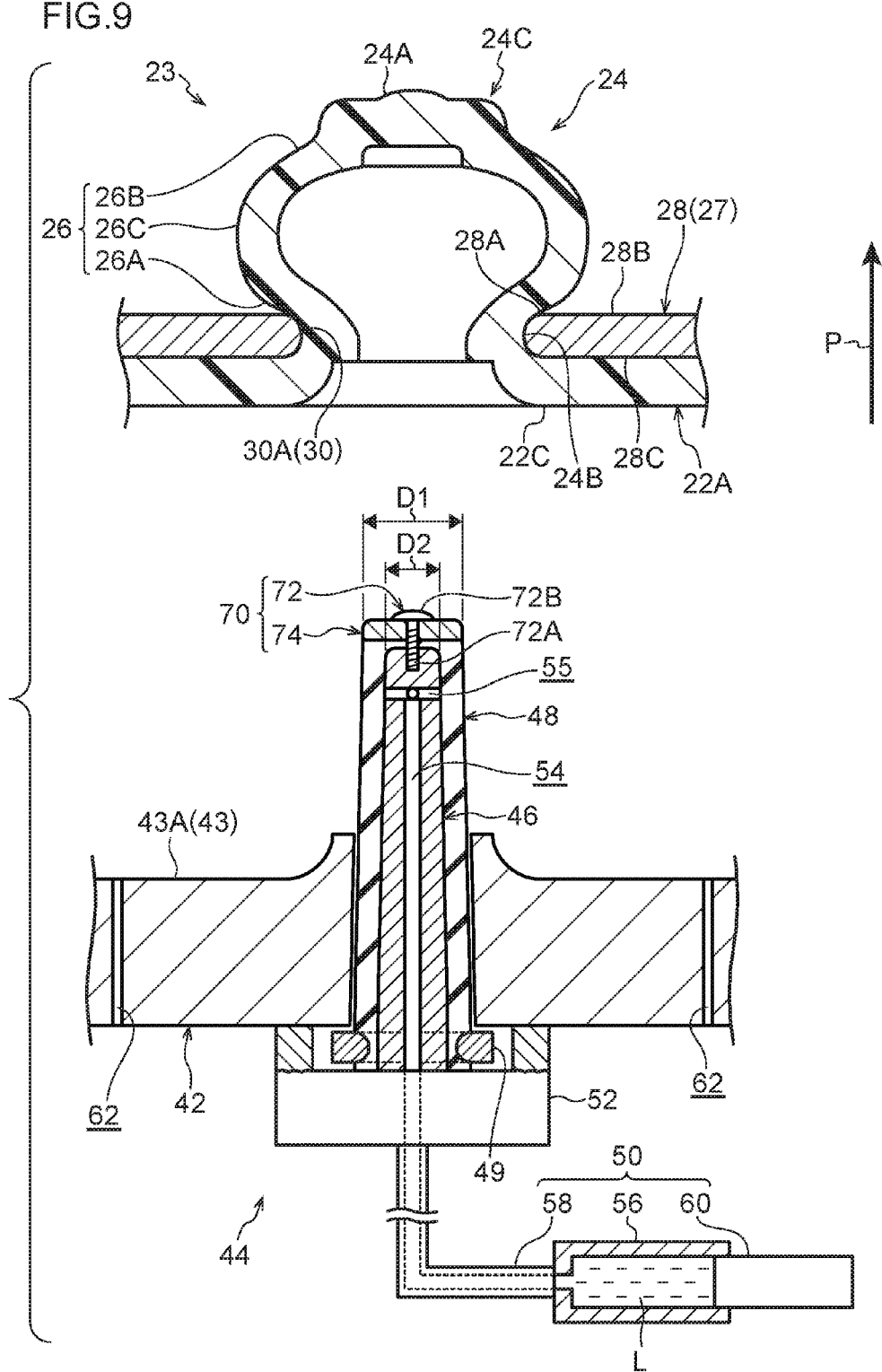
FIG. 9 is a drawing corresponding to FIG. 6, illustrating a state in which a tank configuration member has been separated from a mold.
Figure 10:
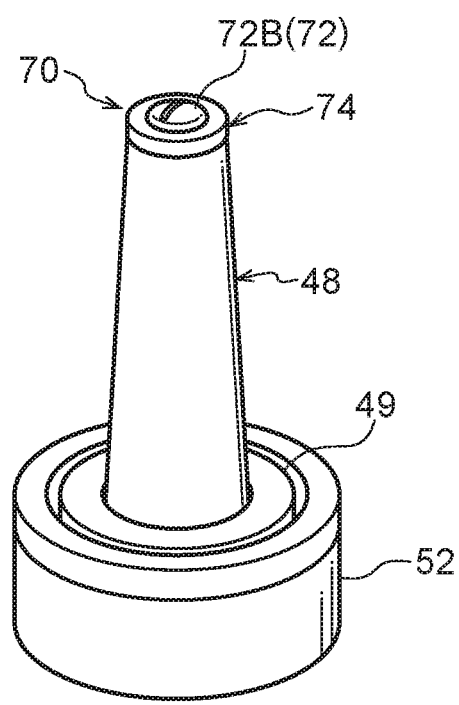
FIG. 10 is a perspective view of a molding device of an inbuilt component fixing section of a fuel tank according to the first exemplary embodiment of the present disclosure.

As illustrated in FIGS. 9 and 10, the plate member 74 has a circular plate shape and a diameter D1 that is larger than a diameter D2 of the leading end portion 46A of the projection pin 46. Outer peripheral edge portions of a plate face of the plate member 74 at the opposite side to the side contacting the elastic body film 48 are gently curved.

The fluid supply device 50 is disposed inside the mold 42. The fluid supply device 50 includes a cylinder 56 which accumulates the fluid L, a pipe 58 that places the inside of the cylinder 56 and the flow path 54 of the projection pin 46 in communication with each other, and a piston 60 that, by moving inside the cylinder 56, increases and decreases the capacity of a fluid accumulation chamber in which the fluid L is accumulated inside the cylinder 56.

Figure 7:
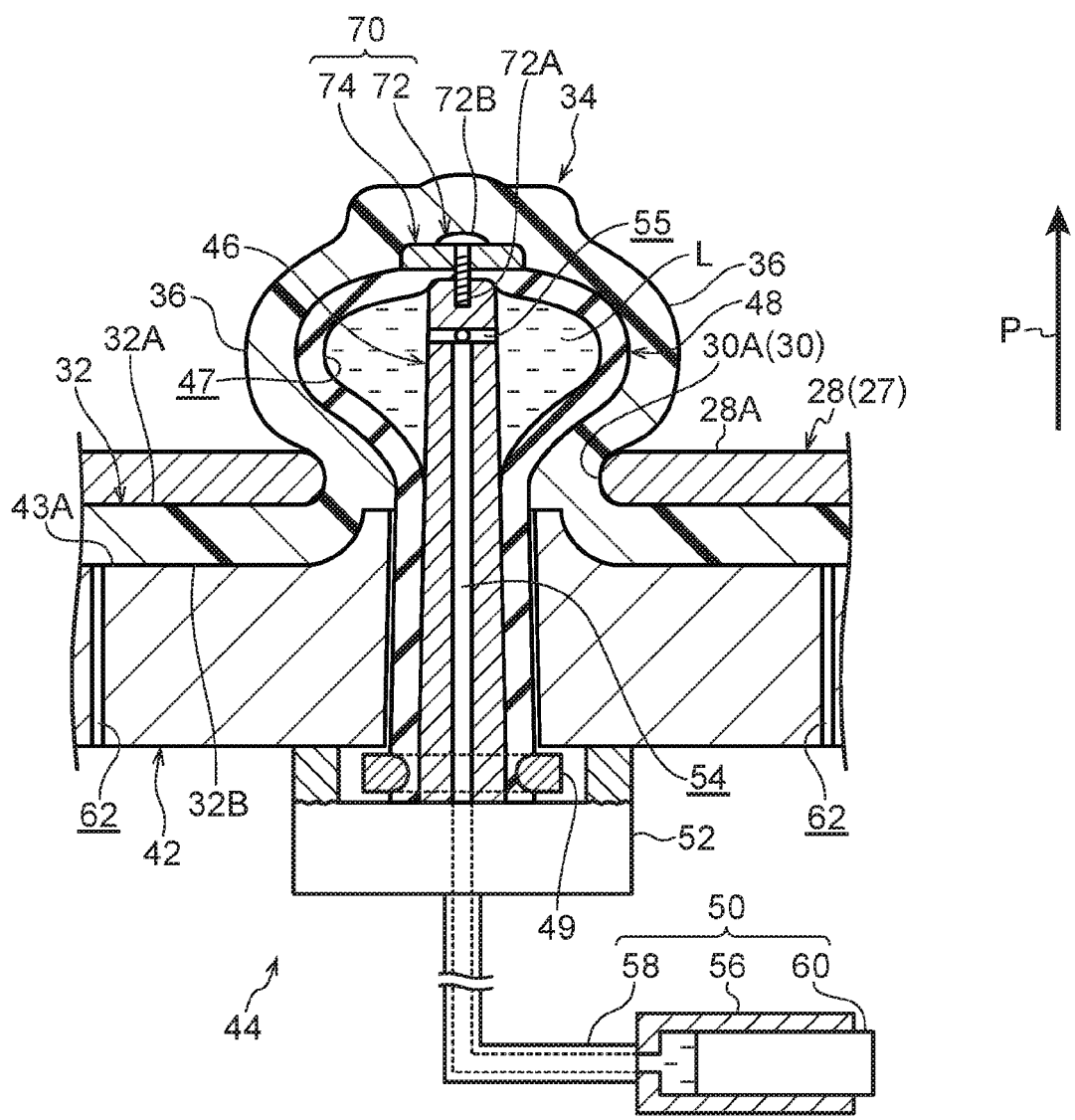
FIG. 7 is a drawing corresponding to FIG. 6, illustrating a state in which an elastic body has been expanded to apply pressure to the bulge section from the inside.

The cylinder 56 has a circular tube shape with one axial direction end portion (a cylinder head side end portion) connected to the pipe 58. The circular column shaped piston 60 is inserted into another axial direction end side of the cylinder 56. Thus, as illustrated in FIG. 7, when the piston 60 is pressed inside the cylinder 56, the capacity of the fluid accumulation chamber inside the cylinder 56 decreases, and fluid L is pressed out from the fluid accumulation chamber. The pressed-out fluid L passes through the pipe 58, the flow path 54, and the branch flow paths 55, and is supplied inside the elastic body film 48. When the piston 60 that has been pressed inward is pulled back from inside the cylinder 56, the capacity of the fluid accumulation chamber inside the cylinder 56 increases and the fluid L is pulled back (recovered) into the fluid accumulation chamber, such that the fluid L is sucked out from inside the elastic body film 48 through the flow path 54, the branch flow paths 55, and the pipe 58. Note that the fluid accumulation chamber referred to herein refers to a section in which the fluid L is accumulated, and is a space (see FIGS. 7 and 8) formed between an inner peripheral face of the cylinder 56 and an end face of the piston 60.

The piston 60 is formed in a circular column shape with an end portion at the opposite side to the fluid accumulation chamber connected to an actuator, not illustrated in the drawings. The piston 60 is configured so as to move inside the cylinder 56 by power from the actuator. Note that an air cylinder, oil cylinder, or servomotor may be employed as the actuator; however, the present disclosure is not limited to this configuration. Packing, not illustrated in the drawings, is attached to an outer periphery of the piston 60 in order to prevent leakage of the fluid L.

Note that there is no particular limitation to the fluid L employed in the fluid supply device 50 as long as it is non-compressible, and, for example, water, oil, or liquid silicone may be employed.

As illustrated in FIG. 4, the mold 42 is provided with gaseous body flow paths 62 that pass through inside the mold 42 and are open at the cavity face 43A. The gaseous body flow paths 62 are connected to a pneumatic circuit, not illustrated in the drawings. The pneumatic circuit is connected to a pressurized gaseous body generator (not illustrated in the drawings) and a negative pressure generator (not illustrated in the drawings), and is configured so as to be capable of supplying a pressurized gaseous body into the periphery of the cavity 43, or sucking out a gaseous body from the periphery of the cavity 43, through the gaseous body flow paths 62. Note that in the present exemplary embodiment, a positive pressure pump is employed as an example of a pressurized gaseous body generator, and a negative pressure pump is employed as an example of a negative pressure generator.

An outer peripheral edge portion 32A of the molten resin sheet 32 that has been guided inside the mold 42 can be pressed against a peripheral portion 42A of the cavity face 43A of the mold 42 by a pressing tool 64. The pressing tool 64 is configured so as to be capable of pressing the entire outer peripheral edge portion 32A of the molten resin sheet 32 against the peripheral portion 42A of the mold 42. When the molten resin sheet 32 is set (disposed) inside the mold 42 using the pressing tool 64, the space between the molten resin sheet 32 and the cavity face 43A is in a sealed state (namely, the sealed space 66 is formed). Note that employing the above-described pneumatic circuit enables a pressurized gaseous body (pressurized air in the present exemplary embodiment) to be supplied inside the sealed space 66 to apply pressure inside the sealed space 66, or for the gaseous body to be sucked out from inside the sealed space 66 to reduce pressure in the sealed space 66.

Explanation follows regarding a manufacturing method of the fuel tank 20 of the present exemplary embodiment.

Setting Process

First the molten resin sheet 32 that will form the tank configuration member 22A configuring the tank main body 22 is manufactured, and the molten resin sheet 32 is guided inside the mold 42 of the tank molding device 40. The outer peripheral edge portion 32A of the molten resin sheet 32 is then pressed against the peripheral portion 42A of the mold 42 by the pressing tool 64 to set the molten resin sheet 32 in the mold 42.

Stretching Process

Next, as illustrated in FIG. 4, a gaseous body is supplied from the pneumatic circuit into the sealed space 66 formed between the molten resin sheet 32 and the cavity face 43A through the gaseous body flow paths 62, pressure is applied inside the sealed space 66, and the molten resin sheet 32 is expanded and stretched into a balloon shape. The thickness of the expanded section of the molten resin sheet 32 is thereby even. The molten resin sheet 32 also gains an excess length portion with respect to the cavity face 43A. The excess length portion of the molten resin sheet 32 can be changed by adjusting the pressure inside the sealed space 66. Note that gaining (having) an excess length portion with respect to the cavity face 43A referred to herein refers to gaining (having) an excess portion by making the surface area of a molding face of the molten resin sheet 32 wider than the area (surface area) of the cavity face 43A.

The excess length portion of the molten resin sheet 32 preferably obtains (generates) the amount of resin required to form a bulge section 34, described later.

Shaping Process

Figure 5:
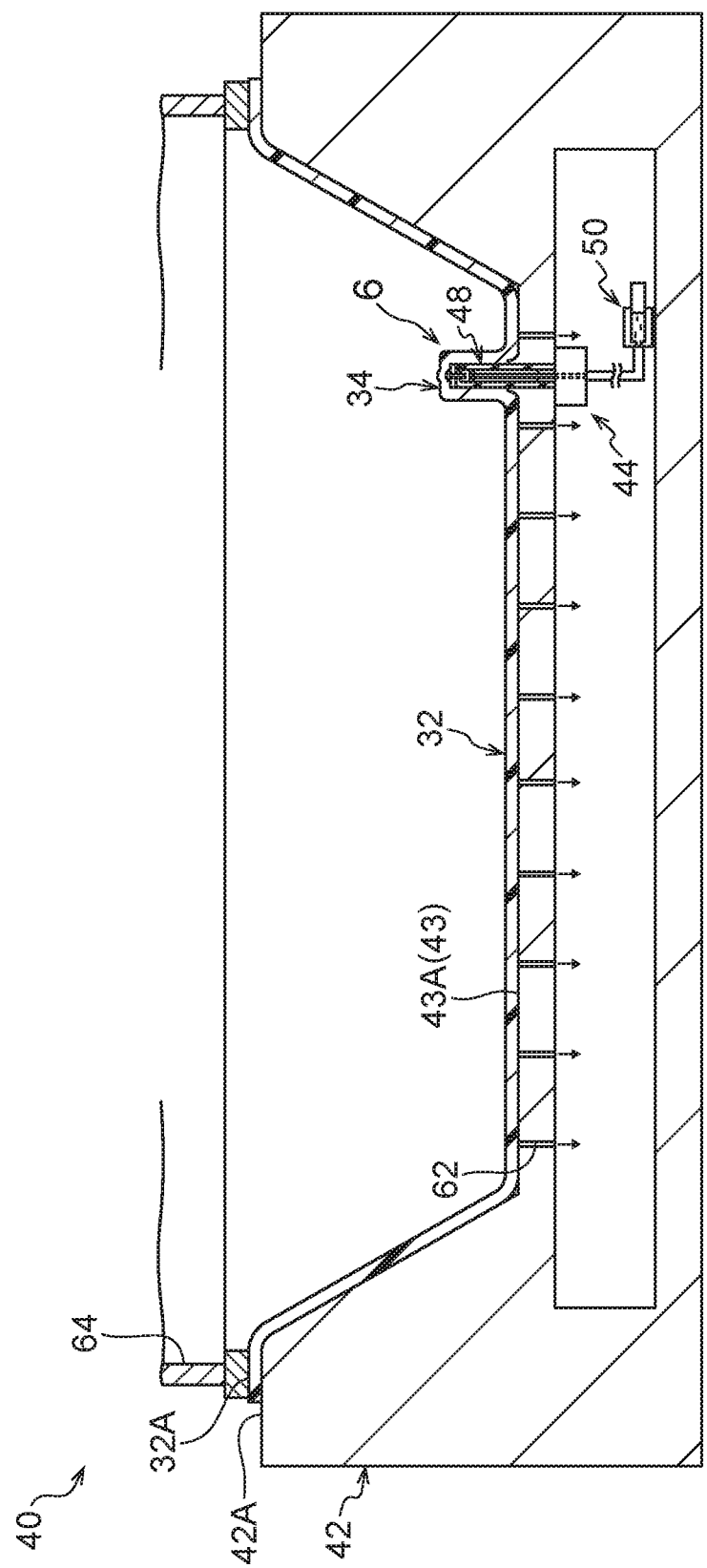
FIG. 5 is a cross-section of a resin sheet, illustrating a state in which the molten state resin sheet that has been expanded to form an excess length portion has been disposed along a cavity face of a mold.

Next, as illustrated in FIG. 5, air is sucked out from the sealed space 66 through the gaseous body flow paths 62 to decrease the pressure inside the sealed space 66, and the stretched molten resin sheet 32 is placed in close contact with the cavity face 43A. The stretched molten resin sheet 32 is thereby disposed along the cavity face 43A. When this is performed, since the projection pin 46 covered by the elastic body film 48 projects out from the cavity face 43A, the portion of the stretched molten resin sheet 32 abutting the projection pin 46 with the elastic body film 48 interposed therebetween projects out in the thickness direction of the molten resin sheet 32 to form the bulge section 34. Note that the excess length portion of the stretched molten resin sheet 32 collects about the projection pin 46 to form the bulge section 34. The stretched molten resin sheet 32 is shaped into the shape of the tank configuration member 22A in this manner.

Placement Process

Next, as illustrated in FIG. 6, the bulge section 34 is inserted into and penetrated through the fixing hole 30 formed to the fastening seat 28 of the inbuilt component 27, the fastening seat 28 is disposed on the stretched molten resin sheet 32, and the other face 28C of the fastening seat 28 is placed in close contact with the molten resin sheet 32.

Pressure Application Process

Next, as illustrated in FIG. 7, in a state in which the bulge section 34 has penetrated through the fixing hole 30 of the inbuilt component 27, pressure is applied to the bulge section 34 from the inside, and at least a portion of the bulge section 34 (the entire portion that has passed through the fixing hole 30 of the bulge section 34 in the present exemplary embodiment) is made to jut out toward the outer peripheral side. Specifically, by supplying fluid L from the fluid supply device 50 into the sealed space 47 through the flow path 54 and the branch flow paths 55, the elastic body film 48 is expanded, pressure is applied to the bulge section 34 from the inside, and the bulge section 34 is deformed so as to jut out toward the outer peripheral side (radial direction outside) of the bulge section 34. This application of pressure is performed until the portion of the bulge section 34 that has passed through the fixing hole 30 juts out as far as the peripheral portion 28A of the fixing hole 30. The jutting-out portion 36 is thereby formed at the outer peripheral side of the bulge section 34. The jutting-out portion 36 is in close contact with the one face 28B of the fastening seat 28, and, together with a general portion 32B of the molten resin sheet 32, sandwiches the peripheral portion 28A. The portion of the bulge section 34 that has been inserted into the fixing hole 30 also juts out toward the outer peripheral side under pressure from the elastic body film 48, and is in close contact with the hole wall face 30A of the fixing hole 30.

Note that the general portion 32B of the present exemplary embodiment indicates a portion of the stretched molten resin sheet 32 that contacts the fastening seat 28.

Cooling Process

Figure 8:
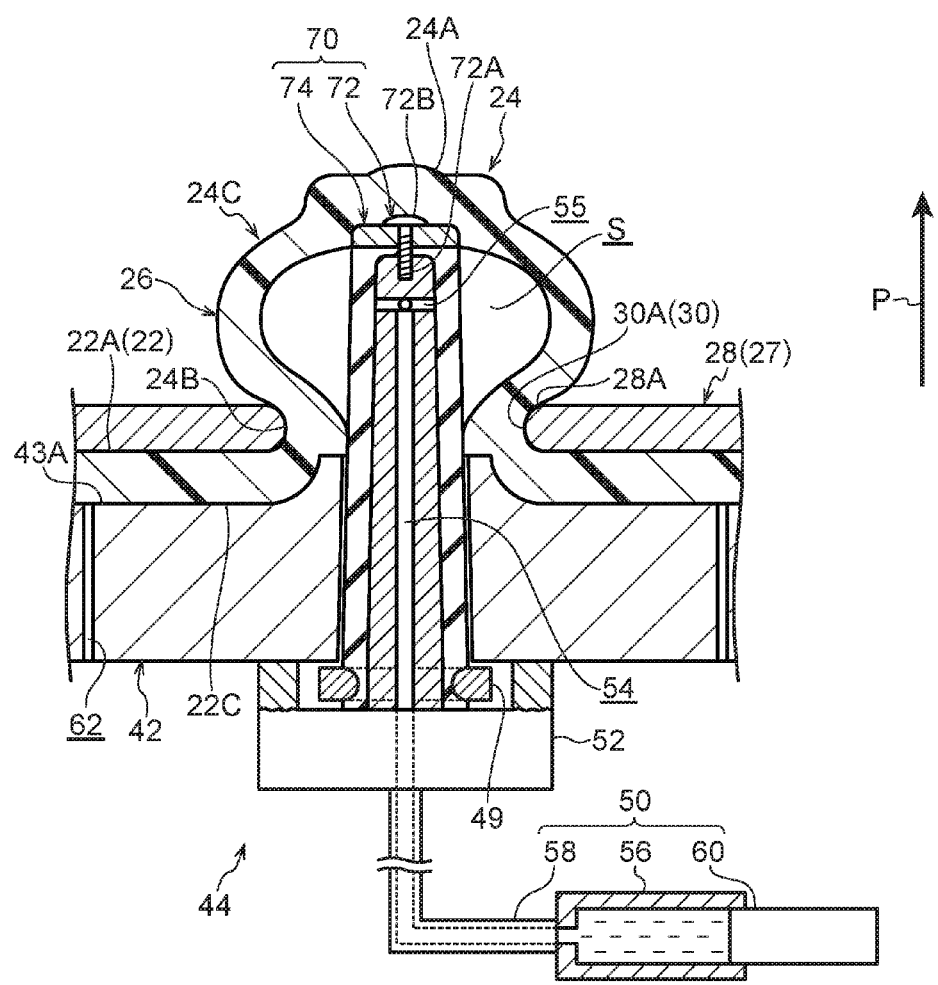
FIG. 8 is a drawing corresponding to FIG. 6, illustrating a state in which an elastic body has been contracted.

Next, in a state in which a molten resin sheet (not illustrated in the drawings) has been disposed along a mold face of a mold (not illustrated in the drawings) for molding the tank configuration member 22B, this mold and the mold 42 are brought together, and the melted resin is cooled and solidified in a state in which the outer peripheral edge portion 32A of the molten resin sheet 32 that will form the tank configuration member 22A, and an outer peripheral edge portion of the molten resin sheet that will form the tank configuration member 22B have been superimposed on each other. The tank main body 22 configured including the tank configuration member 22A and the tank configuration member 22B is formed in this manner. As illustrated in FIG. 8, the fixing section 23 for fixing the inbuilt component 27 to the fuel tank 20 is also formed to the tank main body 22. The inbuilt component 27 is fixed (fastened) to the tank configuration member 22A (tank main body 22) using the fixing section 23.

Note that the cooling of the molten resin may be natural cooling or forced cooling; however, forced cooling is preferable from the perspective of reducing the manufacturing time. Methods of forced cooling of the molten resin include a method in which cooling is performed by blowing a gaseous body (such as air).

Recovery Process

Next, as illustrated in FIG. 8, the fluid L is recovered from inside the elastic body film 48 to the fluid supply device 50 through the branch flow paths 55 and the flow path 54, and the elastic body film 48 is contracted.

As illustrated in FIG. 9, the tank main body 22 is then completed by making ejector pins, not illustrated in the drawings, project out to separate the tank main body 22 from the mold 42.

Note that, in the manufacturing method of the fuel tank 20 of the present exemplary embodiment, the molten resin is cooled and solidified in the state in which the outer peripheral edge portion 32A of the molten resin sheet 32 that will form the tank configuration member 22A and the outer peripheral edge portion of the molten resin sheet that will form the tank configuration member 22B have been superimposed on each other; however, the present disclosure is not limited to this configuration. For example, the tank main body 22 may be formed by molding the tank configuration member 22A and the tank configuration member 22B separately, then superimposing and joining (by welding, for example) the outer peripheral edge portion of the tank configuration member 22A and the outer peripheral edge portion of the tank configuration member 22B.

Explanation follows regarding operation and advantageous effects of the fixing section molding device 44 of the present exemplary embodiment.

In the shaping process of the fixing section molding device 44, when the molten resin sheet 32 is disposed along the cavity face 43A, the bulge section 34 is molded in the molten resin sheet 32 by the projection pin 46. In the state in which the bulge section 34 has been inserted into the fixing hole 30 of the inbuilt component 27 and the bulge section 34 has penetrated through the fixing hole 30 in the placement process, the elastic body film 48 is then expanded, and pressure is applied to the bulge section 34 from the inside, by supplying fluid L into the sealed space 47 from the fluid supply device 50 in the pressure application process. Pressure is applied to the bulge section 34 from the inside by the elastic body film 48 that expands in this manner, and a portion of the bulge section 34 (the portion that has passed through the fixing hole 30 of the bulge section 34 in the present exemplary embodiment) is made to jut out as far as the peripheral portion 28A of the fixing hole 30, such that the peripheral portion 28A of the fixing hole 30 is sandwiched between the jutting-out portion 36 and the general portion 32B of the molten resin sheet 32. After cooling and solidifying the molten resin, the peripheral portion 28A of the fixing hole 30 is sandwiched between the jutting-out portion 36 of the bulge section 34 that has formed the fixing section 23, and the molten resin sheet 32 that has formed the tank configuration member 22A, and the inbuilt component 27 is fixed to the tank configuration member 22A.

Note that, in the fixing section molding device 44, pressure is applied to the hollow bulge section 34 from the inside and a portion of the bulge section 34 is made to jut out as far as the peripheral portion 28A of the fixing hole 30 of the inbuilt component 27 to mold the fixing section 23. This enables the amount of resin required to form the fixing section 23 to be reduced compared to a configuration in which, for example, pressure is applied to a non-hollow projection section from the outside and a portion of the projection section is made to jut out as far as the peripheral portion 28A of the fixing hole 30 of the inbuilt component 27 to mold a fixing section.

In particular, the apex portion 48A of the elastic body film 48 is fixed to the leading end portion 46A of the projection pin 46 using the fixing member 70 (the screw member 72 and the plate member 74). This suppresses the elastic body film 48 from expanding in the projection direction of the projection pin 46, and instead increases the expansion amount of the elastic body film 48 in a direction orthogonal to the projection direction of the projection pin 46 when fluid L is being supplied to the sealed space 47, compared, for example, to a configuration in which the apex portion 48A of the elastic body film 48 is not fixed to the leading end portion 46A of the projection pin 46. The bulge section 34 is shaped by the elastic body film 48 that expands in this manner, such that the bulge section 34 is suppressed from expanding in the projection direction of the projection pin 46, while securing an amount of resin for forming the jutting-out portion 36 of the bulge section 34. This enables the amount of resin required to form the fixing section 23 to be further reduced.

In the fixing section molding device 44, the elastic body film 48 is tube shaped with a circular truncated cone shape. This enables pressure to be applied to the bulge section 34 from the inside substantially evenly around its periphery while the elastic body film 48 is expanding, thereby enabling the thickness of the jutting-out portion 26 of the projection section 24 formed to the tank configuration member 22A to be close to constant.

In the fixing section molding device 44, the screw portion 72A of the screw member 72 is penetrated through the through-hole 74A of the plate member 74 and the through-hole 48B of the elastic body film 48 and is screwed into the screw hole 46B of the projection pin 46. The plate member 74 is thereby pressed toward the leading end portion 46A side of the projection pin 46 by the screw head portion 72B, and the apex portion 48A of the elastic body film 48 is sandwiched and fixed between the plate member 74 and the leading end portion 46A of the projection pin 46. Employing the plate member 74 together with the screw member 72 in this manner enables the apex portion 48A of the elastic body film 48 to be pressed over a wider range than, for example, a configuration in which only the screw member 72 is employed. Thus, expansion of the elastic body film 48 in the projection direction of the projection member is further suppressed, and the expansion amount of the elastic body film 48 in the direction orthogonal to the projection direction of the projection pin 46 is further increased.

In the fixing section molding device 44, configuration is such that the elastic body film 48 is expanded to apply pressure to the bulge section 34 from the inside by supplying fluid L to the sealed space 47. This enables the expansion amount of the elastic body film 48 to be adjusted by adjusting the amount of fluid L supplied into the sealed space 47. This enables the fixing section 23 to be molded with a thickness corresponding to the fastening strength required to fix the inbuilt component 27.

In the fixing section molding device 44, the elastic body film 48 is expanded to apply pressure to the bulge section 34 from the inside. This enables the pressure applied to the portion of the bulge section 34 contacting the elastic body film 48 to be close to even. This enables the bulge section 34 to be deformed so as to follow the elastic body film 48, even if the expansion speed or expansion rate of the elastic body film 48 is increased.

In the fixing section molding device 44, when fluid L is supplied from the flow path 54 into the sealed space 47 through the plural branch flow paths 55 formed at equal spacings about the circumferential direction of the projection pin 46, the elastic body film 48 that covers the projection pin 46 is substantially evenly expanded about its periphery at the outer peripheral side of the projection pin 46 about the projection pin 46 (in other words, the diameter about the projection pin 46 expands substantially evenly viewed in cross-section in the direction orthogonal to the projection direction of the projection pin 46). This enables the jutting-out amount of the bulge section 34 about its periphery to be close to even on being applied with pressure from the inside by the elastic body film 48.

Second Exemplary Embodiment

Figure 11:
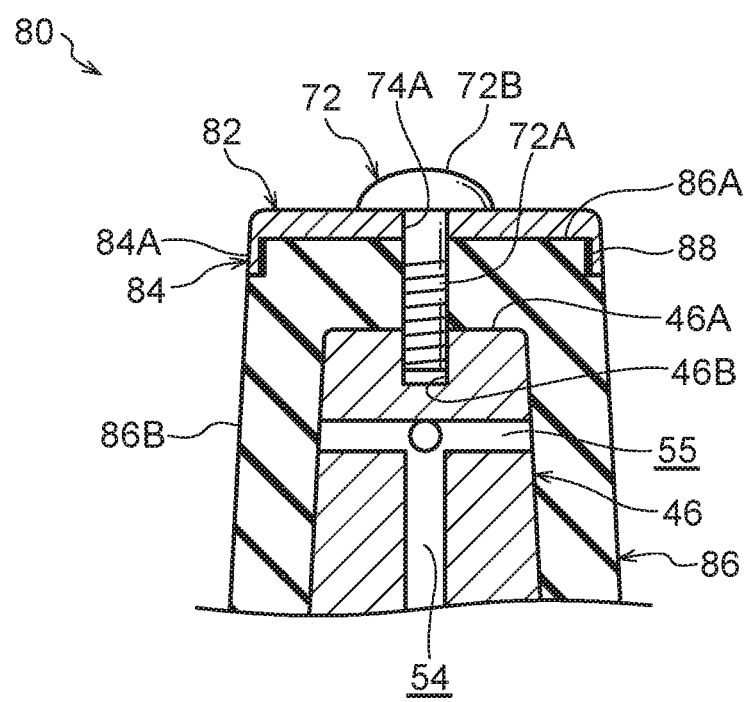
FIG. 11 is an enlarged cross-section of a leading end portion of a projection member employed in a molding device of an inbuilt component fixing section of a fuel tank according to a second exemplary embodiment of the present disclosure.

Explanation follows regarding a fixing section molding device 80 of a second exemplary embodiment of the present disclosure, with reference to FIG. 11. Note that similar configuration to the first exemplary embodiment is appended with the same reference numerals, and explanation thereof is omitted as appropriate.

As illustrated in FIG. 11, the fixing section molding device 80 of the present exemplary embodiment has a similar configuration to the fixing section molding device 44 of the first exemplary embodiment, with the exception that a protruding portion 84 is formed in a plate member 82, and an indented portion 88 is formed at the periphery of an apex portion 86A of an elastic body film 86.

The plate member 82 has a circular plate shape and is formed with the protruding portion 84 projecting out toward the opposite side to the projection direction of the projection pin 46 at an outer peripheral edge portion thereof. The protruding portion 84 is formed about the entire circumference in the circumferential direction of the plate member 82. Note that the plate member 82 has a similar configuration to the plate member 74 of the first exemplary embodiment, with the exception of the configuration of the protruding portion 84.

The elastic body film 86 has a tube shape with a substantially circular truncated cone shape that is closed off at the apex portion 86A, and the indented portion 88 that houses the protruding portion 84 is formed in an outer peripheral face 86B in close proximity to the apex portion 86A. Note that the indented portion 88 of the present exemplary embodiment is a groove portion formed to a corner portion between the apex portion 86A and a side portion of the elastic body film 86. In the present exemplary embodiment, configuration is such that, in a state in which the protruding portion 84 has been housed in the indented portion 88, the outer peripheral face 86B of the elastic body film 86 and an outer peripheral face 84A of the protruding portion 84 are in substantially the same plane.

Explanation follows regarding operation and advantageous effects of the fixing section molding device 80 of the present exemplary embodiment. Note that explanation regarding operation and advantageous effects obtained by similar configuration to the fixing section molding device 44 of the first exemplary embodiment is omitted.

In the fixing section molding device 80, the protruding portion 84 formed at the outer peripheral edge portion of the plate member 82 is housed in the indented portion 88 formed at the elastic body film 86. This enables expansion to be suppressed in the circumferential direction of the apex portion 86A, this being a location of the elastic film body 86 corresponding to the leading end portion of the projection member (in other words, this enables expansion of the apex portion 86A toward the radial direction outside of the projection pin 46 to be suppressed).

In the fixing section molding device 80, the protruding portion 84 of the plate member 82 is housed in the indented portion 88 of the elastic body film 86. This enables the projection pin 46 to be removed from the bulge section 34 that has formed the fixing section 23 during mold removal more easily than in a configuration in which, for example, the protruding portion 84 of the plate member 82 is disposed on an outer peripheral face of an elastic body film. Specifically, there is no undercut portion corresponding to the protruding portion 84 formed to the bulge section 34 due to the protruding portion 84 of the plate member 82, such that the projection pin 46 is more easily removed during mold removal.

Third Exemplary Embodiment

Figure 12:
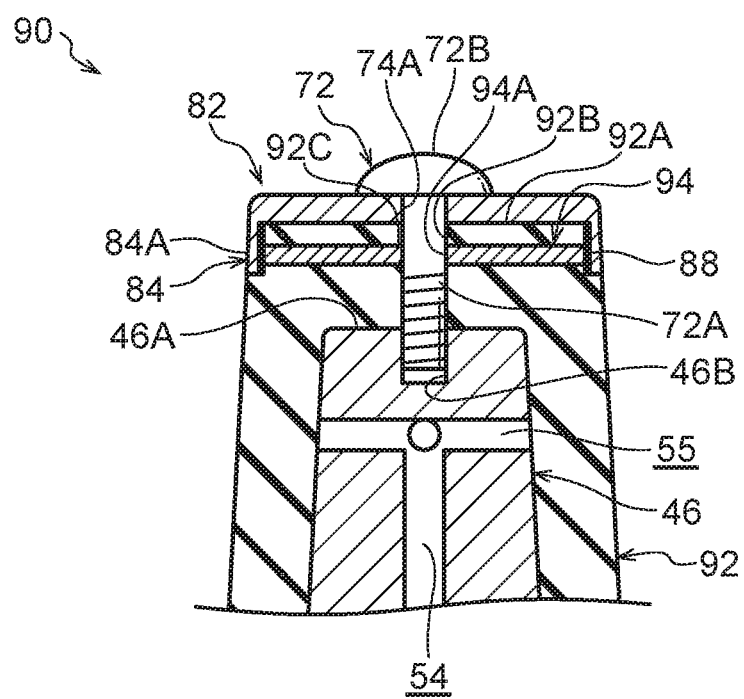
FIG. 12 is an enlarged cross-section of a leading end portion of a projection member employed in a molding device of an inbuilt component fixing section of a fuel tank according to a third exemplary embodiment of the present disclosure.

Explanation follows regarding a fixing section molding device 90 of a third exemplary embodiment of the present disclosure, with reference to FIG. 12. Note that similar configuration to the second exemplary embodiment is appended with the same reference numerals, and explanation thereof is omitted as appropriate.

As illustrated in FIG. 12, the fixing section molding device 90 of the present exemplary embodiment has a similar configuration to the fixing section molding device 80 of the second exemplary embodiment, with the exception that a reinforcement member 94 is disposed inside an apex portion 92A of an elastic body film 92.

The elastic body film 92 has a tube shape with a substantially circular truncated cone shape that is closed off at the apex portion 92A. The annular ring plate shaped reinforcement member 94, which reinforces a peripheral portion 92C of a through-hole 92B through which the screw portion 72A of the screw member 72 penetrates, is disposed inside the apex portion 92A. The reinforcement member 94 is formed of a metal material (steel in the present exemplary embodiment). Note that in the present exemplary embodiment, an inner peripheral face 94A of the reinforcement member 94 and a hole wall face of the through-hole 92B are in substantially the same plane.

Explanation follows regarding operation and advantageous effects of the fixing section molding device 90 of the present exemplary embodiment. Note that explanation regarding operation and advantageous effects obtained by similar configuration to the fixing section molding device 80 of the second exemplary embodiment is omitted.

In the fixing section molding device 90, the reinforcement member 94 that reinforces the peripheral portion 92C of the through-hole 92B is disposed inside the apex portion 92A of the elastic body film 92. The reinforcement member 94 enables stress to be suppressed from concentrating at the peripheral portion 92C of the through-hole 92B of the elastic body film 92 while being expanded.

Figure 13:
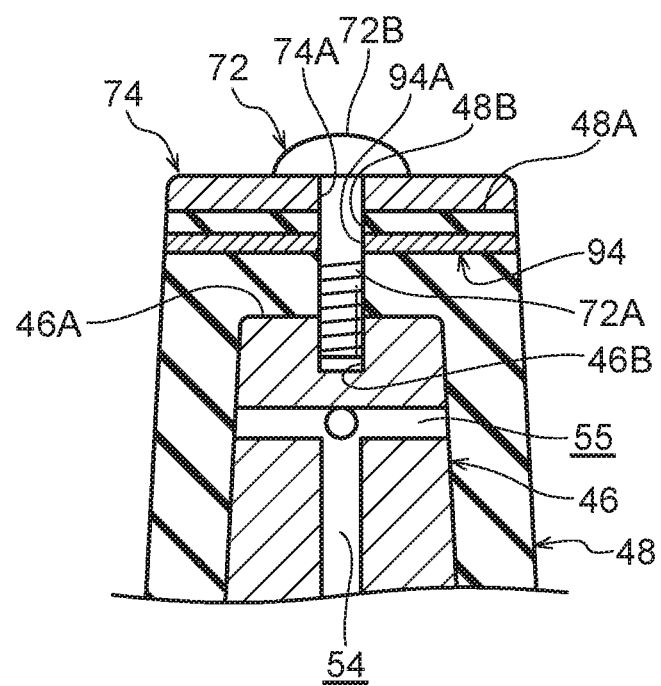
FIG. 13 is an enlarged cross-section of a leading end portion of a projection member employed in a molding device of an inbuilt component fixing section of a fuel tank according to another exemplary embodiment of the present disclosure.

The third exemplary embodiment is configured such that the reinforcement member 94 is disposed inside the apex portion 92A of the elastic body film 92; however, the present disclosure is not limited to this configuration. As illustrated in FIG. 13, for example, a configuration may be applied in which the reinforcement member 94 is disposed inside the apex portion 48A of the elastic body film 48 configuring the fixing section molding device 44 of the first exemplary embodiment to reinforce the through-hole 48B.

In the first exemplary embodiment, the fixing member 70 is configured including the screw member 72 and the plate member 74; however, the present disclosure is not limited to this configuration. For example, the fixing member 70 may be configured by only the screw member 72. In such cases, the apex portion 48A of the elastic body film 48 can be sandwiched between the screw head portion 72B and the leading end portion 46A of the projection pin 46 without employing the plate member 74 by forming the screw head portion 72B of the screw member 72 with the diameter of the plate member 74, or greater. Note that configuration of the fixing member 70 with only the screw member 72 may also be applied to the second exemplary embodiment and the third exemplary embodiment.

Exemplary embodiments of the present disclosure have been explained above; however, the present disclosure is not limited to the above description, and obviously various other modifications may be implemented within a range not departing from the spirit of the present disclosure.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A molding device of an inbuilt component fixing section of a fuel tank, the molding device comprising:
    a projection member that projects out at a placement face onto which a resin sheet that will form a tank configuration member of a tank main body is disposed in a molten state, and that molds a hollow bulge section in the resin sheet;
    an elastic body that covers an outer periphery of the projection member, and that expands and applies pressure to the bulge section from the inside due to a non-compressible fluid being supplied into a sealed space formed between the elastic body and the projection member;
    a fluid supply device that is configured to supply the fluid into the sealed space and is configured to recover the fluid from the sealed space, and that supplies the fluid into the sealed space in a state in which the bulge section has penetrated through a fixing hole provided in an inbuilt component; and
    a fixing member that is attached to a leading end portion of the projection member and that fixes a location of the elastic body, corresponding to the leading end portion, to the leading end portion.

2. The molding device of an inbuilt component fixing section of a fuel tank of claim 1, wherein:
    a screw hole is provided to the leading end portion of the projection member; and
    the fixing member is configured including
        a plate member that is disposed on a surface at the corresponding location of the elastic body, and
        a screw member that penetrates through the plate member and the elastic body and that includes a screw portion screwed into the screw hole and a screw head portion pressing the plate member toward a leading end portion side of the projection member.

3. The molding device of an inbuilt component fixing section of a fuel tank of claim 2, wherein:
    a protruding portion that projects out toward the opposite side to a projection direction of the projection member is formed at an outer peripheral edge portion of the plate member; and
    an indented portion, in which the protruding portion is housed, is formed at an outer peripheral face of the elastic body.

4. The molding device of an inbuilt component fixing section of a fuel tank of claim 2, wherein:
    a reinforcement member that reinforces a peripheral portion of a through-hole, through which the screw portion penetrates, is disposed inside the corresponding location of the elastic body.

* * * * *

UNITED STATES PATENT AND TRADEMARK OFFICE
CERTIFICATE OF CORRECTION

PATENT NO. : 9,937,654 B2  
APPLICATION NO. : 15/197912  
DATED : April 10, 2018  
INVENTOR(S) : Miki Kimura Page 1 of 1

It is certified that error appears in the above-identified patent and that said Letters Patent is hereby corrected as shown below:

In the Specification

Column 6, Line 14, before "and juts out toward" delete "2413" and insert --24B--, therefor.

Signed and Sealed this  
Twelfth Day of June, 2018

Andrei Iancu  
*Director of the United States Patent and Trademark Office*